UNITED STATES PATENT OFFICE.

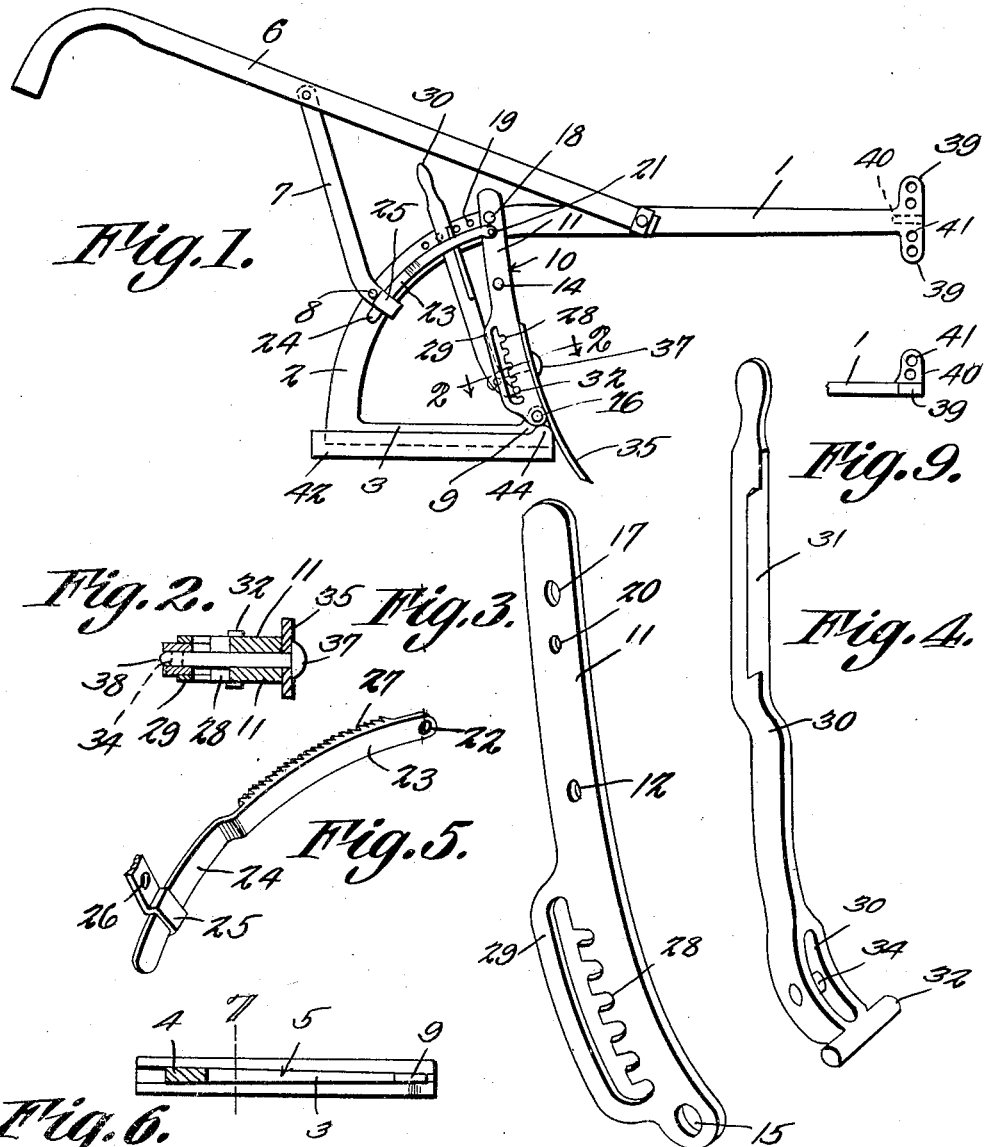

WILLIAM T. HERNDON, OF PARKTON, NORTH CAROLINA.

PLOW.

1,351,850.  Specification of Letters Patent.  Patented Sept. 7, 1920.

Application filed January 15, 1920. Serial No. 351,529.

*To all whom it may concern:*

Be it known that I, WILLIAM T. HERNDON, a citizen of the United States, residing at Parkton, in the county of Robeson and State of North Carolina, have invented a new and useful Plow, of which the following is a specification.

The device forming the subject matter of this application is a plow, and one object of the invention is to provide novel means whereby the share or shovel point may be held adjustably on the standard.

Another object of the invention is to provide novel means for assembling the shoe with the foot of the plow beam.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a plow constructed in accordance with the invention; Fig. 2 is a section taken on the line 2—2 of Fig. 1; Fig. 3 is a perspective view showing one of the constituent members of the standard; Fig. 4 is a perspective view showing the lever which holds the point or share in place; Fig. 5 is a perspective view disclosing the keeper; Fig. 6 is a horizontal section showing the shoe and the foot, the view being, in substance, a top plan of the parts mentioned; Fig. 7 is a transverse section taken on the line 7—7 of Fig. 6; Fig. 8 is an elevation showing the securing element whereby the plow point is connected with the lever; and Fig. 9 is a fragmental top plan showing the forward end of the plow beam.

The device forming the subject matter of this application comprises a beam 1 including a gooseneck 2 terminating in a forwardly extended foot 3 which is transversely tapered as shown at 4, and longitudinally tapered from the rear to the front, as disclosed at 5, the foot being provided at its forward end with a lug 9. The forward end of the beam 1 is supplied with vertical extensions 39 and with a horizontal extension 40 provided with holes 41, adapted to receive a clevis (not shown), the extensions permitting the hitch to be accomplished in various ways, depending upon the position of the draft animal or animals with respect to the standing plants.

The forward ends of handles 6 are connected to the beam 1, the upper ends of braces 7 being united with the handles. The lower ends of the braces 7 are connected by a securing element 8 with the gooseneck portion 2 of the beam 1. The numeral 10 designates, generally, a standard, the standard being a two-part structure, comprising a pair of members 11, the beam 1 being received between the upper ends of the said members. The members 11 are provided intermediate their ends with holes 12 adapted to receive a rivet or like securing device 14, the members 11 of the standard thus being connected to move as one piece.

In the lower ends of the members 11 of the standard 10 are openings 15 adapted to receive a pivot element 16 mounted in the lug 9 of the foot 3. The standard 10, therefore, is pivotally connected at its lower end with the foot 3, for swinging adjustment, the members 11 of the standard being provided with openings 17 adapted to receive a pin 18 or like connecting device, the pin being insertible into any one of a plurality of openings 19 fashioned in the gooseneck 2 of the beam 1, it being observed that the openings are located in an arc of which the pivot element 16 is a center. The members 11 of the standard 10 are provided with openings 20 receiving a pivot element 21 mounted in an opening 22 formed in the forward end of the offset portion 23 of a keeper 24, the keeper being curved on an arc of which the pivot element 16 is a center. The rear end of the keeper 24 is adapted to reciprocate in a guide 25 attached to the gooseneck 2 by the securing element 8 which connects the lower ends of the braces 7 with the gooseneck, the guide 25 being supplied with a hole 26 adapted to receive the securing element 8. On its inner side, the offset portion 23 of the keeper 24 is equipped with rack teeth 27. The members 11 of the standard 10 have a plurality of seats 28 in their rear edges, those portions of the members 11 which carry the seats 28 being spanned by a bridge 29.

The numeral 30 denotes a lever, the upper end of which is adapted to move between the offset portion 23 of the keeper 24 and the gooseneck 2 of the plow beam 1. The lever 30 has a laterally extended fixed pawl 31 adapted to coöperate with the teeth 27 of the keeper 24, either the pawl or the lever having enough resiliency so that the pawl may be engaged with any of the teeth 27. At its lower end, the lever 30 is supplied with a transverse foot 32 which may be mounted in any of the seats 28 of the members 11 of the standard 10. Immediately above the foot 32 there is an opening 33 in the lever, a pin 34 extending across the opening.

The numeral 35 denotes a share of any desired sort, the same, in the present instance, being depicted in the form of a simple shovel point. The numeral 36 marks a securing element extended between the members 11 of the standard 10 and through the share 35, the forward end of the securing element being supplied with a head 37 engaging the share. The rear end of the securing element 36 projects into the opening 33 of the lever 30 and is equipped with a hook 38 engaging the pin 34, the securing element thus being connected pivotally with the lever 30.

The numeral 42 designates a foot having a dovetailed groove 43 which tapers from its rear end to its forward end. In the groove 43 the foot 3 is received, the shoe being wedged on the foot against rearward movement, and being held on the foot against downward movement, owing to the fact that the foot has a transverse taper as indicated at 4, and is provided with a longitudinal taper, as shown at 5 and as hereinbefore explained.

In practical operation, the shoe 42 is slid rearwardly on the foot 3 until the shoe is bound on the foot, an upstanding lug 44 at the forward end of the shoe coöperating with the share or shovel point 35 to prevent the shoe from sliding forwardly on the foot.

The part 32 of the lever 30 may be received in any of the seats 28 of the parts 11 of the standard 10, thus to secure a vertical adjustment of the shovel point 35, and to accommodate the plow to shovel points of different lengths measured vertically. The bridges 29 prevent part 32 of the lever 30 from being disengaged entirely from the standard 10 without, however preventing the part 32 from being shifted from one of the seats 28 to the other. The standard 10 may be swung forwardly or rearwardly on the pivot element 16, thus to adjust the angle between the shovel point 35 and the surface of the soil, the standard being held in adjusted positions by inserting the pin or connecting device 18 in the openings 19 in the gooseneck 2. When the lever 30 is swung rearwardly, the fulcrum for the lever is provided by coöperation between the foot 32 and the seats 28, the securing element 36 being drawn rearwardly, because the hook 38 of the securing element is connected with the pin 34 of the lever. The head 37 of the securing element draws the shovel point 35 rearwardly, the shovel point being bound firmly against the forward edge of the standard 10. After the lever 30 has been swung rearwardly to an adjusted position in order to tighten up and hold the shovel point 35, the pawl 31 is engaged with the rack teeth 27 of the keeper 24. Since the keeper 24 is pivoted at 21—22 to the standard 10 the keeper will slide readily in the guide 25 when the standard 10 is swung forwardly or rearwardly on its pivotal mounting 16.

Having thus described the invention, what is claimed is:—

1. In a plow, a beam having a forwardly extended foot; a standard pivoted at its lower end to the foot for swinging adjustment; means for holding the standard in adjusted positions; a lever fulcrumed on the standard; means for holding the lever in adjusted positions; a share engaging the forward edge of the standard; and a securing element connected with the share, the securing element being pivotally engaged with the lever.

2. In a plow, a beam having a forwardly extended foot; a standard extended between the foot and the beam; a lever, the lever and the standard being provided with interengaging elements whereby the lever may be fulcrumed on the standard at adjusted heights; a share engaging the forward edge of the standard; and a securing element connected to the share, the securing element being pivotally engaged with the lever.

3. In a plow, a beam having a forwardly extended foot; a standard pivoted at its lower end to the foot for swinging adjustment; means for holding the standard in adjusted positions; a lever, the lever and the standard being provided with interengaging elements whereby the lever may be fulcrumed on the standard at adjusted heights; a share engaging the forward edge of the standard; and a securing element connected to the share, the securing element being pivotally engaged with the lever.

4. In a plow, a beam having a forwardly extended foot; a standard pivoted at its lower end to the foot for swinging adjustment; means for holding the standard in adjusted positions; a lever fulcrumed on the standard; a keeper extended rearwardly from the standard, the keeper and the lever being provided with interengaging elements for holding the lever in adjusted positions; a share engaging the forward edge of the standard; and a securing element connected to the share, the securing element being pivotally engaged with the lever.

5. In a plow, a beam having a forwardly extended foot; a standard pivoted at its lower end to the foot for swinging adjustment; means for holding the standard in adjusted positions; a lever fulcrumed on the standard; a share engaging the forward edge of the standard; a securing element connected to the share and pivotally engaged with the lever; a guide on the beam; and a keeper pivotally engaged with the standard and slidable in the guide, the keeper and the lever being provided with interengaging elements coöperating to hold the lever in adjusted positions.

6. In a plow, a beam including a forwardly extended foot; a standard pivoted to the foot for swinging adjustment; means for holding the standard in adjusted positions; a share coöperating with the forward edge of the standard; a lever; means for fulcruming the lever on the standard at adjusted points longitudinally of the standard; means for connecting the lever with the share; and means for holding the lever in adjusted positions.

In testimony that I claim the foregoing as my own, I have hereto affixed my signature in the presence of two witnesses.

WILLIAM T. HERNDON.

Witnesses:
JOHN E. BURCH,
IVY E. SIMPSON.